US009098493B2

(12) United States Patent
    Tardif

(10) Patent No.: US 9,098,493 B2
(45) Date of Patent: *Aug. 4, 2015

(54) MACHINE BASED SIGN LANGUAGE INTERPRETER

(71) Applicant: Microsoft Technology Licensing, LLC, Redmond, WA (US)

(72) Inventor: John Tardif, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,174

(22) Filed: Apr. 24, 2014

(65) Prior Publication Data
    US 2014/0316763 A1    Oct. 23, 2014

Related U.S. Application Data

(63) Continuation of application No. 12/794,455, filed on Jun. 4, 2010, now Pat. No. 8,751,215.

(51) Int. Cl.
    *G06F 17/28*    (2006.01)
    *G06F 3/01*     (2006.01)
    (Continued)

(52) U.S. Cl.
    CPC ............ *G06F 17/2827* (2013.01); *G06F 3/017* (2013.01); *G06F 17/2818* (2013.01); *G06K 9/00355* (2013.01); *G06K 9/00389* (2013.01);
    (Continued)

(58) Field of Classification Search
    CPC ...................................................... G06F 17/28

USPC .......................................... 704/2–7; 382/291
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    101539994 A    9/2009
CN    101605399 A    12/2009
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Jesse Pullias
(74) *Attorney, Agent, or Firm* — Judy Yee; Micky Minhas

(57) ABSTRACT

A computer implemented method for performing sign language translation based on movements of a user is provided. A capture device detects motions defining gestures and detected gestures are matched to signs. Successive signs are detected and compared to a grammar library to determine whether the signs assigned to gestures make sense relative to each other and to a grammar context. Each sign may be compared to previous and successive signs to determine whether the signs make sense relative to each other. The signs may further be compared to user demographic information and a contextual database to verify the accuracy of the translation. An output of the match between the movements and the sign is provided.

20 Claims, 13 Drawing Sheets

(51) Int. Cl.
*G06K 9/00* (2006.01)
*G09B 21/00* (2006.01)
*E05F 15/00* (2015.01)

(52) U.S. Cl.
CPC ............. *G09B 21/009* (2013.01); *E05F 15/00* (2013.01); *E05Y 2400/852* (2013.01); *E05Y 2400/86* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,666,400 A | 9/1997 | McAllister et al. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,477,239 B1 | 11/2002 | Ohki et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,549,887 B1 | 4/2003 | Ando et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,277,858 B1 | 10/2007 | Weaver et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |

(56) References Cited

U.S. PATENT DOCUMENTS

| | | | |
|---|---|---|---|
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,565,295 | B1 | 7/2009 | Hernandez-Rebollar |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,082,152 | B2 | 12/2011 | Francioli |
| 2002/0152077 | A1 | 10/2002 | Patterson |
| 2003/0191779 | A1 | 10/2003 | Sagawa et al. |
| 2004/0143430 | A1 | 7/2004 | Said et al. |
| 2004/0193413 | A1 | 9/2004 | Wilson et al. |
| 2005/0271279 | A1 | 12/2005 | Fujimura et al. |
| 2007/0057912 | A1 | 3/2007 | Romriell et al. |
| 2008/0026838 | A1 | 1/2008 | Dunstan et al. |
| 2008/0152191 | A1 | 6/2008 | Fujimura et al. |
| 2009/0040215 | A1 | 2/2009 | Afzulpurkar et al. |
| 2009/0141933 | A1 | 6/2009 | Wagg |
| 2009/0221368 | A1 | 9/2009 | Yen et al. |
| 2011/0301934 | A1 | 12/2011 | Tardif |

FOREIGN PATENT DOCUMENTS

| | | |
|---|---|---|
| CN | 101254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2009026337 A1 | 2/2009 |
| WO | WO2009059065 | 5/2009 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Schneider, "Sign Language Expression: The Importance of Gestures and Facial Expressions", essortment: information and advice you want to know, website, Pagewise 2002, http://www.essortment.com/lifestyle/signlanguageex_shrn.htrn.

Funamizu, "Sign Language Interpreter", Petitinvention: Better Design for a Better Life, blog website, Feb. 2009, http://petitinvention.wordpress.com/2009/02/23/sign-language-interpreter/.

Lee, "User-Centered Development of a Gesture-Based American Sign Language Game", at the Instructional Technology and Educa-

(56) References Cited

OTHER PUBLICATIONS tion of the Deaf Symposium, National Technical Institute for the Deaf, Jun. 2005, Rochester, NY, USA.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Office Action dated Jan. 31, 2013, in Chinese Patent Appl. No. 201110159925.7 filed Jun. 3, 2011.

Amendment dated Jun. 14, 2013, in Chinese Patent Appl. No. 201110159925.7 filed Jun. 3, 2011.

Chinese Office Action dated Aug. 1, 2013, in Chinese Patent Appl. No. 201110159925.7 filed Jun. 3, 2011.

Response to Office Action dated Oct. 14, 2013, in Chinese Patent Appl. No. 201110159925.7 filed Jun. 3, 2011.

English translation of the Amended Claims filed in Response to Office Action dated Oct. 14, 2013, in Chinese Patent Appl. No. 201110159925.7 filed Jun. 3, 2011.

Dreuw et al. "Visual Modeling and Feature Adaptation in Sign Language Recognition". IEEE 2008 ITG Conference on Voice Communication, pp. 1-4.

Dreuw et al. "Speech Recognition Techniques for a Sign Language Recognition System". Interspeech 2007, Belgium, Antwerp.

Office Action dated Sep. 17, 2012, in U.S. Appl. No. 12/794,455, filed Jun. 4, 2010.

Amendment dated Feb. 16, 2013, in U.S. Appl. No. 12/794,455, filed Jun. 4, 2010.

Office Action dated Mar. 18, 2013, in U.S. Appl. No. 12/794,455, filed Jun. 4, 2010.

Amendment dated May 24, 2013, in U.S. Appl. No. 12/794,455, filed Jun. 4, 2010.

Notice of Allowance dated Jan. 27, 2014, in U.S. Appl. No. 12/794,455, filed Jun. 4, 2010.

Notice of Allowance dated Nov. 6, 2013, in Chinese Patent Appl. No. 201110159925.7 filed Jun. 3, 2011.

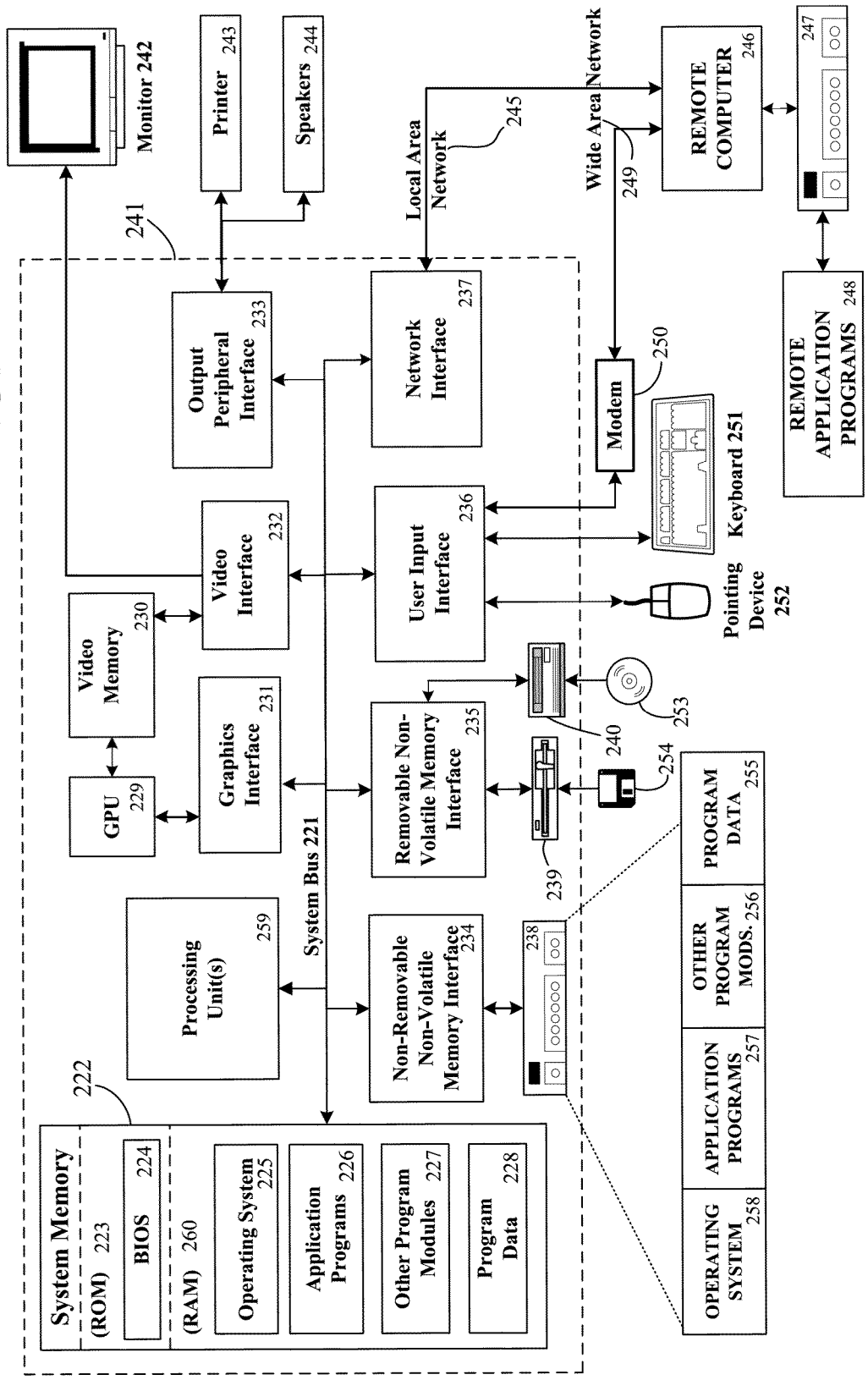

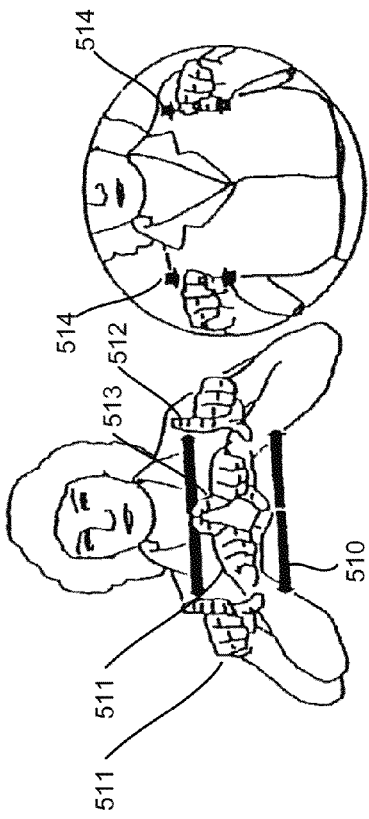
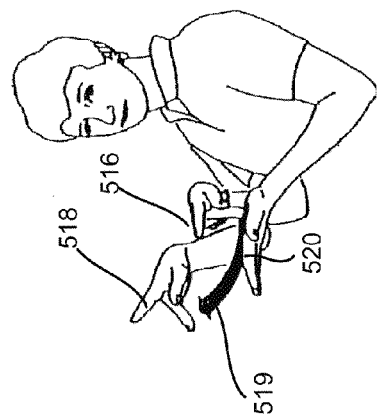
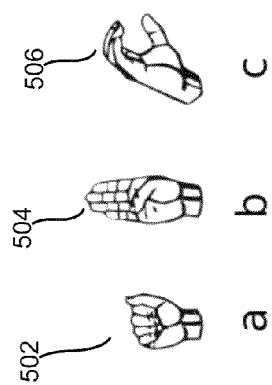
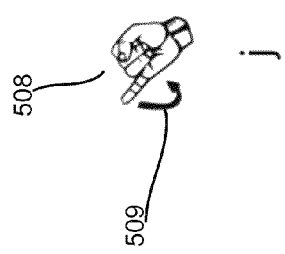
FIG. 5D
FIG. 5C
FIG. 5A
FIG. 5B

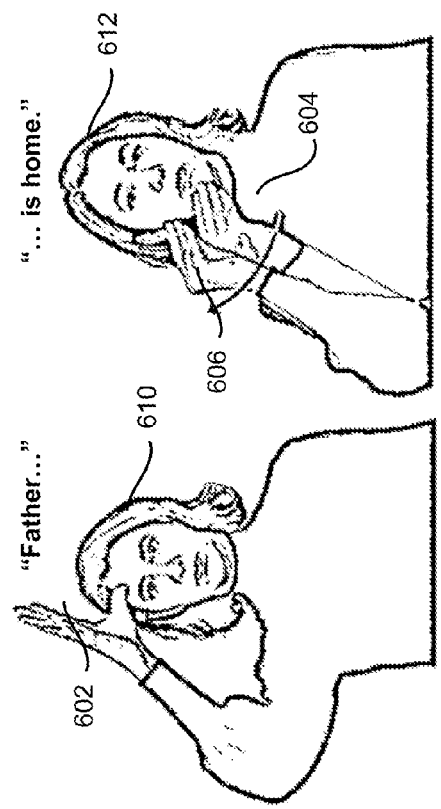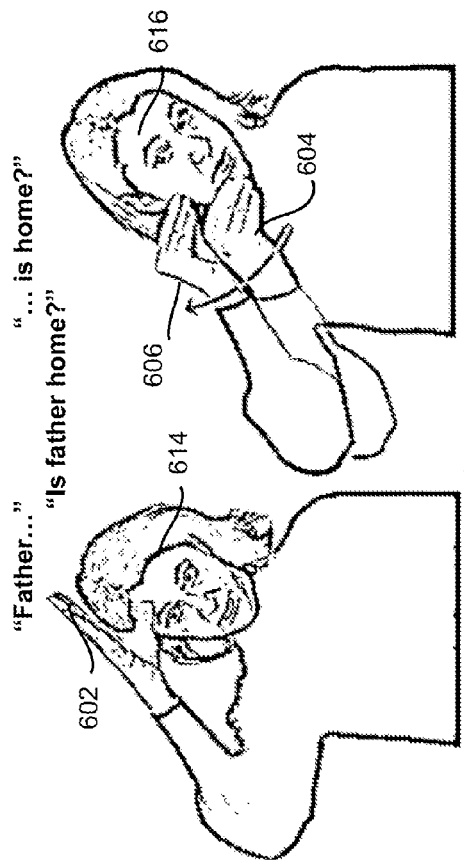

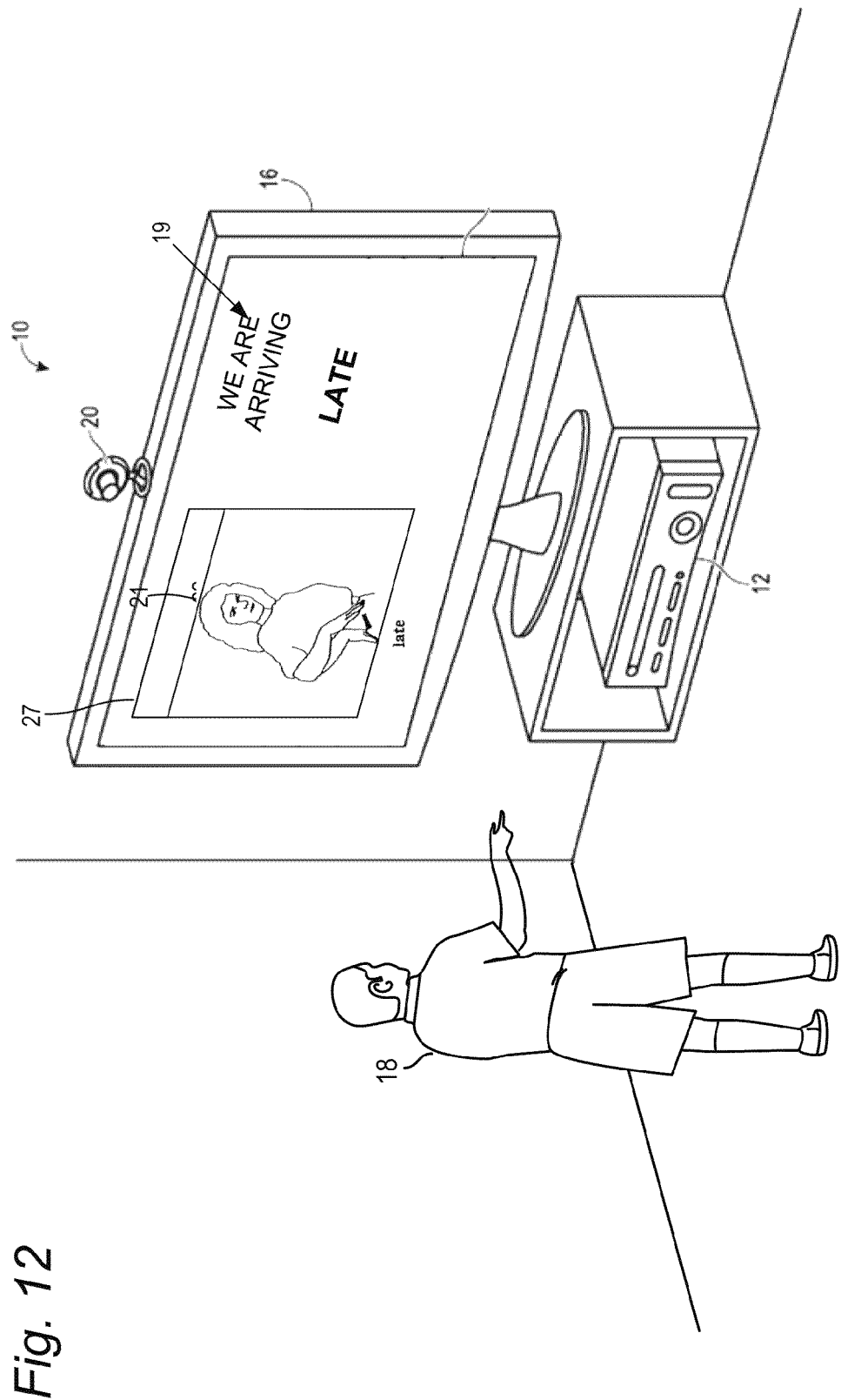

US 9,098,493 B2

MACHINE BASED SIGN LANGUAGE INTERPRETER

CLAIM OF PRIORITY

This application is a continuation of U.S. patent application Ser. No. 12/794,455 filed on Jun. 4, 2010 entitled "MACHINE BASED SIGN LANGUAGE INTERPRETER", published as US-2011-0301934A1 on Dec. 8, 2011.

BACKGROUND

Language translation systems have been developed in a number of different contexts. Technology exists to translate written language from one language to another, and to display sign language motions to users based on selecting a specific meaning or word to be displayed.

Systems have been disclosed that utilize multiple sensors, such as cameras, to detect motion and gestures for purposes of controlling a computer interface, such as a game.

SUMMARY

Technology is provided which transcribes sign language (communication by gestures) into written or auditory forms of communication. User gestures (usually using the hands) are detected and detected gestures are matched to signs. Successive signs are detected and compared to a grammar library to determine whether the signs assigned to gestures make sense relative to each other and to a grammar context. In one embodiment, a computer implemented method for interpreting sign language is provided. A capture device captures a scene including a human target and the users' body part movements (especially hands) within the scene are tracked. Gestures are detected and compared to gestures matched with sign language signs in a lexicon library. Each sign may be compared to previous and successive signs to determine whether the signs make sense relative to each other. The signs may further be compared to user demographic information and a contextual database to verify the accuracy of the translation. An output of the match between the movements and the sign is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates a second example embodiment of a computing system that may be used to track motion and update an application based on the tracked motion.

FIGS. 5A-5D are representations of various visual signs of American Sign Language (ASL).

FIGS. 6A and 6B are representations of various visual signs of American Sign taken in different contexts.

FIGS. 11-12 show exemplary display output and user interfaces used with the system of the present technology.

DETAILED DESCRIPTION

Technology is provided for performing sign language translation based on a user's gestures. A capture device is used to detect user gestures and detected gestures are matched to signs. Successive signs are detected and compared to a grammar library to determine whether the signs assigned to gestures make sense relative to each other and to a lexicon context. Each sign may be compared to previous and successive signs to determine whether the signs make sense relative to each other. The signs may further be compared to user demographic information and a contextual database to verify the accuracy of the translation. An output of the match between the movements and the sign is provided.

Figure 1A:
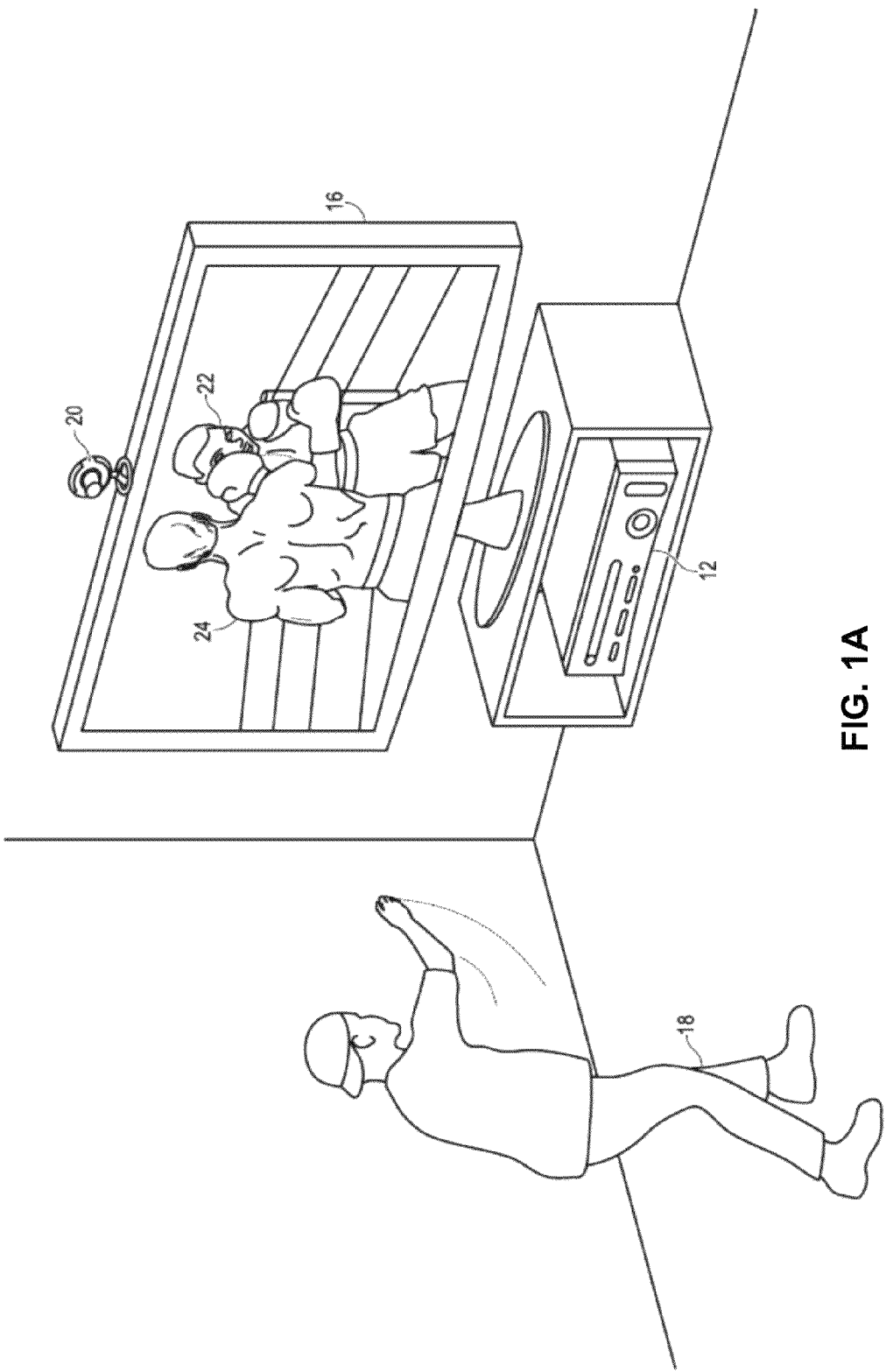
FIGS. 1A and 1B illustrate an example embodiment of a tracking system with a user playing a game.

FIG. 1A illustrates an example embodiment of a system 10 which can be used with the present technology. One use of the exemplary tracking and rendering system 10 is where a user 18 plays a game. Alternatively, as discussed herein, the system may be utilized for translation and interpretation of sign language when the gestures of the user are recognized as signs in one or more sign language.

In FIG. 1A the example is the user playing a boxing game. In an example embodiment, the system 10 may be used to recognize, analyze, and/or track a human target such as the user 18 or other objects within range of tracking system 10.

Tracking system 10 may include a computing system 12. The computing system 12 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

As shown in FIG. 1A, tracking and rendering system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within the application and/or animate an avatar or on-screen character, as will be described in more detail below.

According to one embodiment, the tracking and rendering system 10 may be connected to an audio/visual device 16 such as a television, a monitor, a high-definition television (HDTV), or the like that may provide game or application visuals and/or audio to a user such as the user 18. For example, the computing system 12 may include a video adapter such as a graphics card and/or an audio adapter such as a sound card that may provide audio/visual signals associated with the game application, non-game application, or the like. The audio/visual device 16 may receive the audio/visual signals from the computing system 12 and may then output the game or application visuals and/or audio associated with the audio/visual signals to the user 18. According to one embodiment, the audio/visual device 16 may be connected to the computing system 12 via, for example, an S-Video cable, a coaxial cable, an HDMI cable, a DVI cable, a VGA cable, component video cable, or the like.

As shown in FIG. 1A, the system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character. Similarly, tracking system 10 may be used to recognize, analyze, and/or track persons who are watching user 18 play the game so that movement by those persons watching user 18 play the game will control movement avatars in the audience at the boxing game displayed on audio/visual device 16.

Figure 1B:
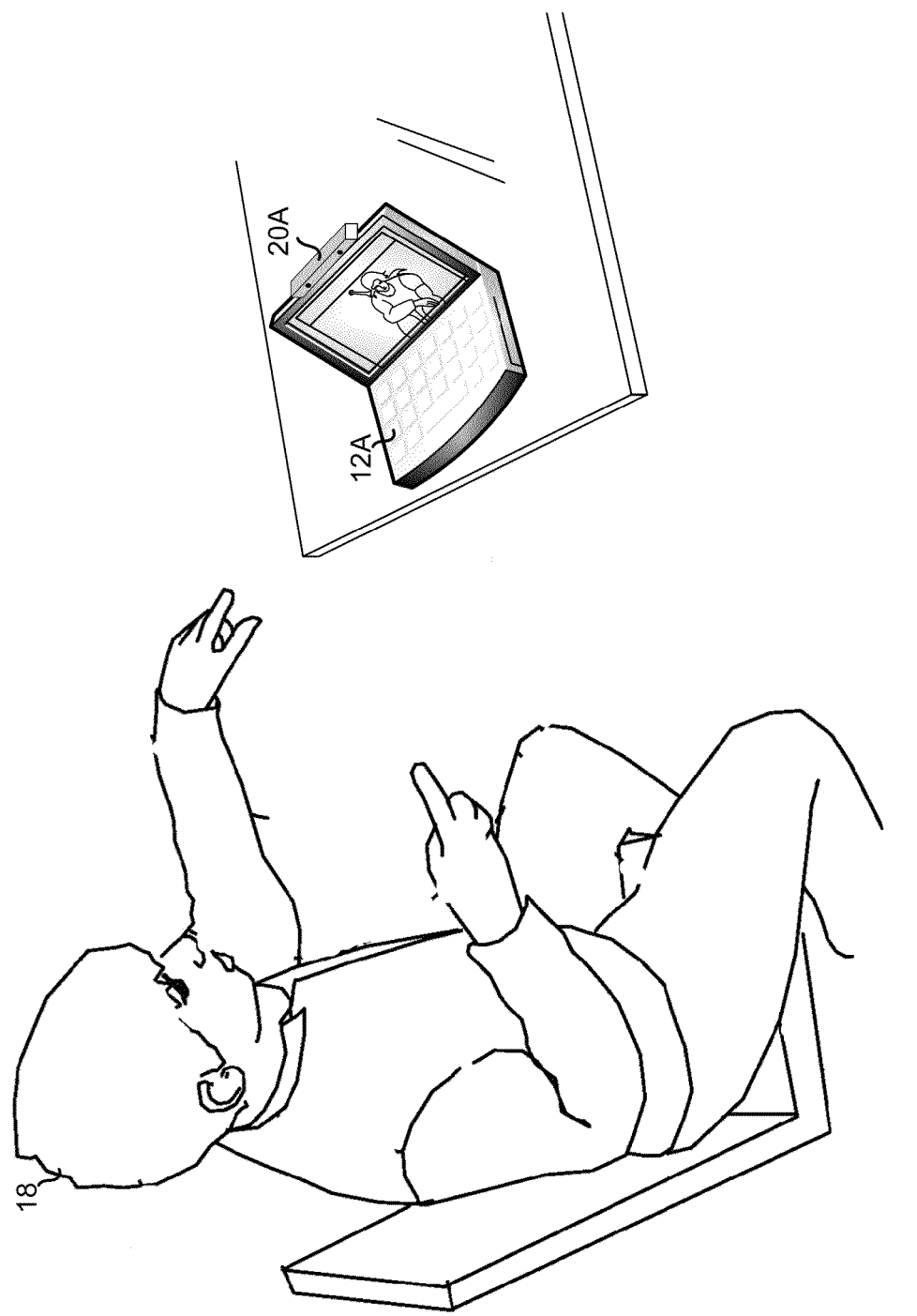

In the example depicted in FIG. 1A, the application executing on the system 10 may be a boxing game that the user 18 is playing. For example, the computing system 12 may use the audio/visual device 16 to provide a visual representation of a boxing opponent 22 to the user 18. The computing system 12 may also use the audio/visual device 16 to provide a visual representation of a user avatar 24 that the user 18 may control with his or her movements. For example, as shown in FIG. 1B, the user 18 may throw a punch in physical space to cause the user avatar 24 to throw a punch in game space. Thus, according to an example embodiment, the computer system 12 and the capture device 20 recognize and analyze the punch of the user 18 in physical space such that the punch may be interpreted as a game control of the user avatar 24 in game space and/or the motion of the punch may be used to animate the user avatar 24 in game space.

According to other example embodiments, the system 10 may further be used to interpret target movements as operating system and/or application controls that are outside the realm of games. For example, virtually any controllable aspect of an operating system and/or application may be controlled by movements of the target, such as the user 18.

In other embodiments, as illustrated in FIG. 1B, a user 18 can perform the motions preceded before a processing device 12A and a capture device 20A in a smaller field of vision at a distance closer to the capture device than illustrated in FIG. 1A. In the illustration on FIG. 1B, the processing device 12A is a notebook computer, and the distance between user 18 and the capture device 20A is much smaller than the embodiment depicted in FIG. 1A. In addition, because the user is closer to the capture device, the field of view of the capture device is smaller. All other elements being equal, a capture device positioned closer to the user 18 as illustrated in FIG. 1B with a resolution equivalent to that of capture device 20 in FIG. 1A will have a greater ability to capture the user's finger and facial movements.

Suitable examples of a system 10 and components thereof are found in the following co-pending patent applications: U.S. patent application Ser. No. 12/475,094 entitled "Environment And/Or Target Segmentation", filed 29 May 2009; U.S. patent application Ser. No. 12/511,850, entitled "Auto Generating a Visual Representation", filed 29 Jul. 2009; U.S. patent application Ser. No. 12/474,655, "Gesture Tool" filed on May 29, 2009; U.S. patent application Ser. No. 12/603,437, "Pose Tracking Pipeline," filed on Oct. 21, 2009, (hereinafter referred to as the '437 application); U.S. patent application Ser. No. 12/475,308, "Device for Identifying and Tracking Multiple Humans Over Time," filed on May 29, 2009; "Motion Detection Using Depth Images," filed on Dec. 18, 2009; and U.S. patent application Ser. No. 12/575,388, "Human Tracking System," filed on Oct. 7, 2009; U.S. patent application Ser. No. 12/422,661, "Gesture Recognizer System Architecture," filed on Apr. 13, 2009; U.S. patent application Ser. No. 12/391,150, "Standard Gestures," filed on Feb. 23, 2009; and U.S. patent application Ser. No. 12/474,655, "Gesture Tool" filed on May 29, 2009.

Figure 2:
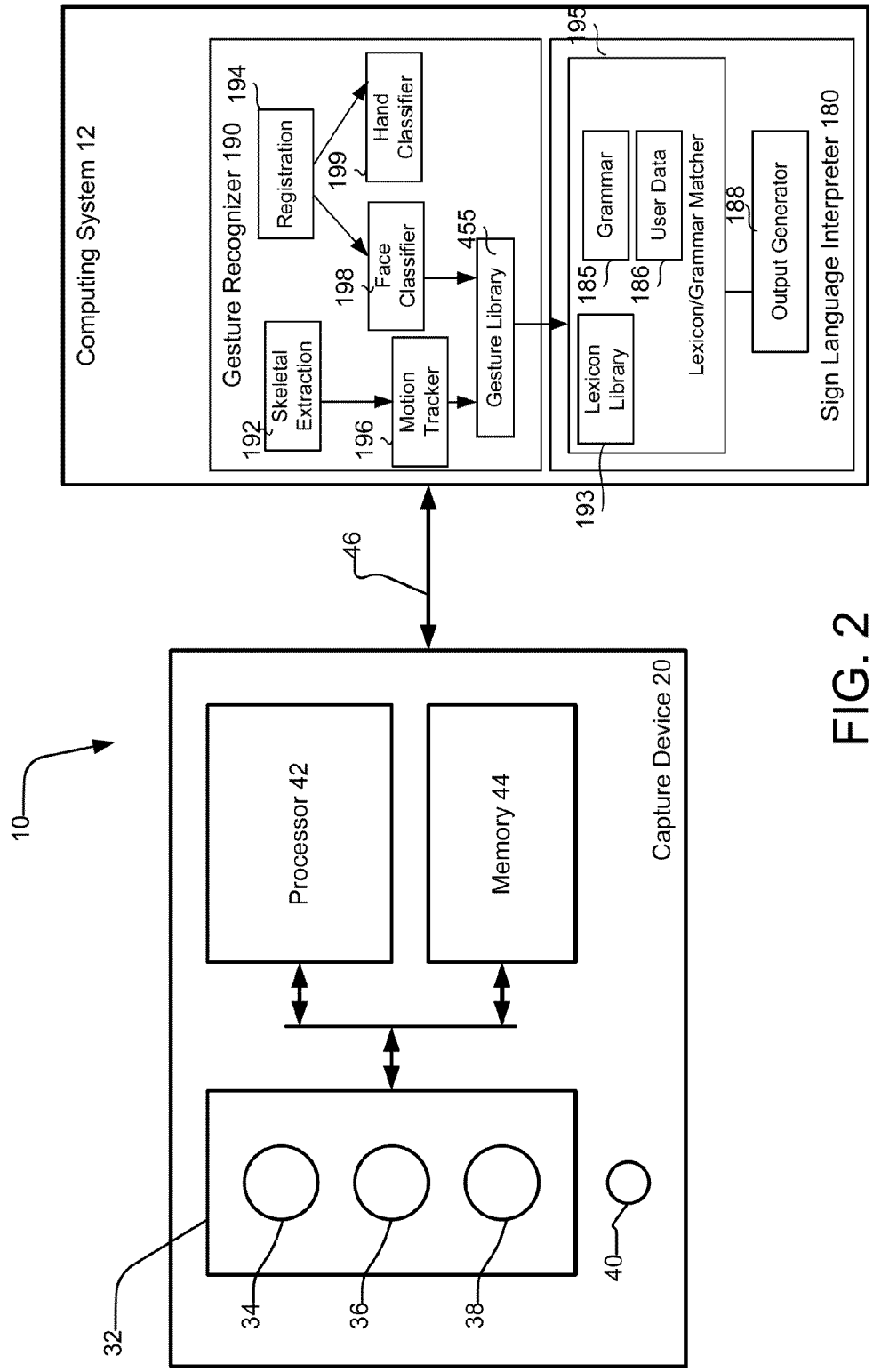
FIG. 2 illustrates an example embodiment of a capture device that may be used as part of the tracking system.

FIG. 2 illustrates an example embodiment of a capture device 20 that may be used for target recognition, analysis, and tracking in a scene, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 32. According to an example embodiment, the image camera component 32 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 32 may include an IR light component 34, a first sensor such as a three-dimensional (3-D) camera 36, and a second sensor such as an RGB camera 38 that may be used to capture the depth image of a scene. Each of these components is focused on a scene. For example, in time-of-flight analysis, the IR light component 34 of the capture device 20 may emit an infrared light onto the scene and may then use sensors (not shown) to detect the backscattered light from the surface of one or more targets and objects in the scene using, for example, the a 3-D camera 26 and/or the RGB camera 38. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 34. Upon striking the surface of one or more targets or objects in the scene, the pattern may become deformed in response. Such a deformation of the pattern may be captured by, for example, the 3-D camera 36 and/or the RGB camera 38 and may then be analyzed to determine a physical distance from the capture device 20 to a particular location on the targets or objects.

According to another embodiment, the capture device 20 may include two or more physically separated cameras or sensors that may view a scene from different angles, to obtain visual stereo data that may be resolved to generate depth information.

In another example embodiment, the capture device 20 may use point cloud data and target digitization techniques to detect features of the user.

The capture device 20 may further include a microphone 40, or an array of microphones. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor or microcontroller 42 that may be in operative communication with the image camera component 32. The processor 42 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 44 that may store the instructions that may be executed by the microcontroller 42, images or frames of images captured by the 3-d camera 36 or RGB camera 38, or any other suitable information, images, or the like. According to an example embodiment, the memory component 44 may include random access memory (RAM), read only memory (ROM), cache, Flash memory, a hard disk, or any other suitable storage component. Together, the microcontroller 42 and memory may be collectively referred to as a microcontroller.

As shown in FIG. 2, in one embodiment, the memory component 44 may be a separate component in communication with the image capture component 32 and the processor 42. According to another embodiment, the memory component 44 may be integrated into the processor 42 and/or the image capture component 32.

As shown in FIG. 2, the capture device 20 may be in communication with the computing environment 12 via a communication link 40. The communication link 46 may be a wired connection including, for example, a USB connection, a Firewire connection, an Ethernet cable connection, or the like and/or a wireless connection such as a wireless 802.11 b, g, a, or n connection. According to one embodiment, the computing environment 12 may provide a clock to the capture device 20 that may be used to determine when to capture, for example, a scene via the communication link 46.

Additionally, the capture device 20 may provide the depth information and images captured by, for example, the 3-D camera 36 and/or the RGB camera 38, and a skeletal model that may be generated by the capture device 20 to the computing environment 12 via the communication link 46. The computing environment 12 may then use the skeletal model, depth information, and captured images to, for example, control an application such as a game or word processor.

Figure 3:
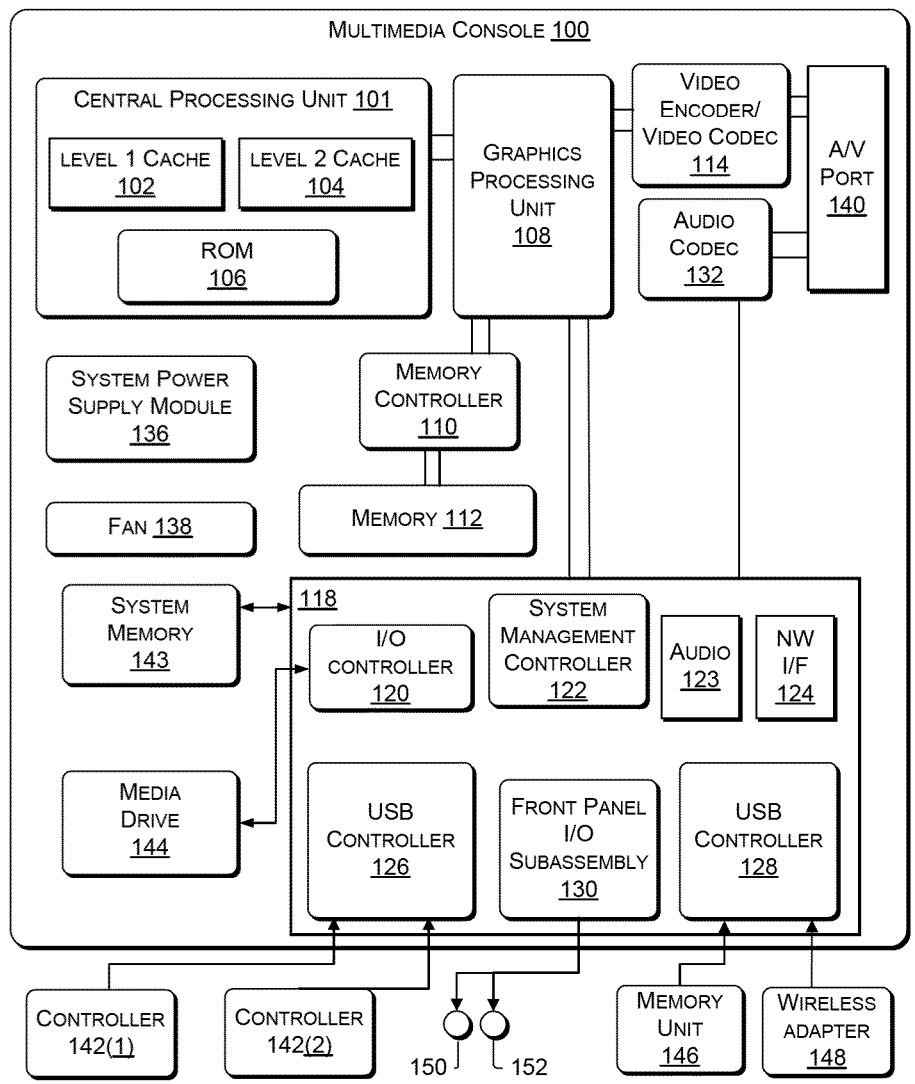
FIG. 3 depicts an example of a processing device that may be used to track gestures and execute and application based on the tracked gesture.

Computing environment 12 may include components such as those illustrated in FIGS. 3 and 4 to enable operation of applications, such as a boxing application or a sign language interpreter 180, to be performed thereon.

Figure 10A:
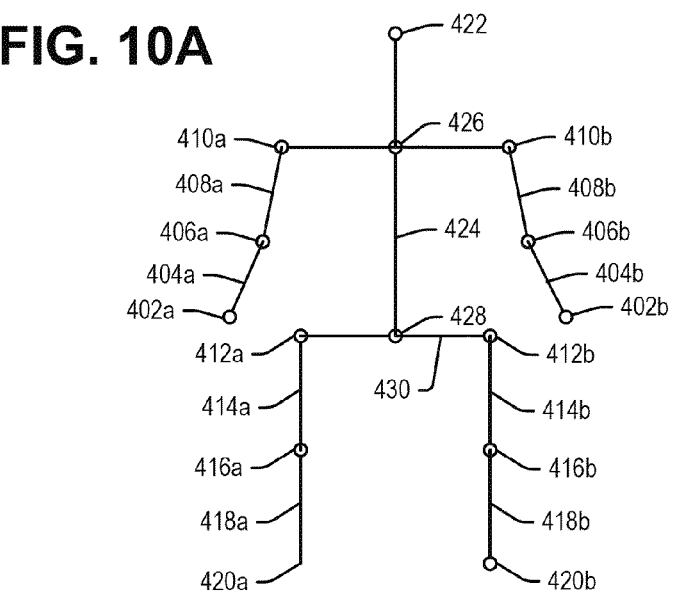
FIGS. 10A-10E are a representation of a gesture recognizer and skeletal tracking models for a user.

In FIG. 2, illustrated in computing system 12 are a gesture recognizer 190 and a sign language interpreter 180. In one embodiment, the gesture recognizer 190 may comprise, for example, a skeletal extraction component 192, a motion tracker 196, a registration component 194, a face classifier 198, and hand classifier 199. The skeletal extraction component 192 functions in accordance with U.S. patent application Serial Ser. No. 12/475,094 to extract and define a skeletal system to track user motion. Examples of skeletal systems are illustrated in FIGS. 10A and 10C. The motion tracking component 186 operates in conjunction with the disclosure of the '437 application to track the motion of the detected skeleton within a scene. Motions and gesture components are translated into gestures which are matched against a library 193 of known signs which are equivalent to gestures. Gesture components include, but are not limited to: hand shape and configuration relative to a user's body and other hand; finger shape and configuration relative to a user's hand, other fingers and body; hand and finger orientation (e.g. up, down, sideways); hand, finger arm and head movement including the beginning and ending positions of the movement relative to other hand, finger, arm and body positions (e.g. across the chest, off to the side, etc.). This is illustrated in FIG. 10A below. The registration component 194 synchronizes the information provided by the components 34, 36, 38, 40, of capture device 20. Information from the capture device may, as discussed above, include depth and image information. Registration component 194 synchronizes this information to detect gesture movement.

Face classifier 198 and hand classifier 199 detect fine-grained changes in a users hand and face, hand and finger shape as well as configuration, orientation, position and movement, all of which can affect the interpretation of a gesture as described below. Detection of face expression and a individual digit movements of a hand may be relevant to the interpretation of a gesture as a sign as illustrated in FIGS. 5 and 6. Face classifier 198 and hand classifier 199 work in conjunction with skeletal extraction component 192, a motion tracker 196. The skeletal extraction component 192, a motion tracker 196 inform the face classifier 198 and hand classifier 199 where the hands and face are located in the scene so that the hand and face classifiers are not burdened with determining that for themselves. The skeletal extraction component 192 also uniquely identifies each user so that each user's sign language conversations can be tracked independently.

Where the resolution of the capture device 20 is sufficient to provide tracking of a model of a hand or face, face classifier 198 and hand classifier 199 determine positions of the users face and hands based on motions of the face and hands that add information to the matching algorithm of the a Lexicon/grammar matcher 195, both of which detect the user 18 in a scene based on the information provided by the capture device 20 to provide a sign language output 188. The Lexicon/Grammer matcher 195 may include a lexicon dictionary 193, user data 186 and a grammar library 185. When a gesture is detected, the information is fed to the Lexicon/grammar matcher 195 which consults the dictionary 193 and compares detected motions to those stored in the dictionary to determine the meaning of particular signs provided by the user. This is described below with respect to FIG. 7 and may be enabled by one or more hardware components and a processor which is specifically programmed to execute instructions to accomplish the techniques described herein. In addition, signs assigned to gestures are compared to the grammar library 185 and user data 186 to verify the accuracy of the assignment of the sign to the gesture. The grammar library 185 contains information on whether any sign makes sense in light of preceding and succeeding signs. User data 186 contains user specific demographics and other user-specific information used to determine if the sign makes sense in view of specific known user information.

The target recognition, analysis and tracking system 10 may determine whether the depth image includes a human target. In one embodiment, the edges of each target such as the human target and the non-human targets in the captured scene of the depth image may be determined. As described above, each of the depth values may represent a depth value such as a length or distance in, for example, centimeters, millimeters, or the like of an object in the captured scene from the capture device 20. According to an example embodiment, the edges may be determined by comparing various depth values associated with, for example, adjacent or nearby pixels of the depth image. If the various depth values being compared are greater than a predetermined edge tolerance, the pixels may define an edge.

According to another embodiment, predetermined points or areas on the depth image may be flood filled to determine whether the depth image includes a human target. For example, various depth values of pixels in a selected area or point of the depth image may be compared to determine edges that may define targets or objects as described above. In an example embodiment, the predetermined points or areas may be evenly distributed across the depth image. For example, the predetermined points or areas may include a point or an area in the center of the depth image, two points or areas in between the left edge and the center of the depth image, two points or areas between the right edge and the center of the depth image, or the like.

The Z values of the Z layers may be flood filled based on the determined edges. For example, the pixels associated with the determined edges and the pixels of the area within the determined edges may be associated with each other to define a target or an object in the capture area that may be compared with a pattern.

According to an example embodiment, each of the flood-filled targets, human and non-human may be matched against a pattern to determine whether and/or which of the targets in the capture area include a human. The pattern may include, for example, a machine representation of a predetermined body model associated with a human in various positions or poses such as a typical standing pose with arms to each side.

In an example embodiment, the human target may be isolated and a bitmask of the human target may be created to scan for one or more body parts. For example, after a valid human target is found within the depth image, the background or the area of the depth image not matching the human target can be removed. A bitmask may then be generated for the human target that may include values of the human target along, for example, an X, Y, and Z axis. According to an example embodiment, the bitmask of the human target may be scanned for various body parts, starting with, for example, the head to generate a model of the human target. The top of the bitmask may be associated with a location of the top of the head. After determining the top of the head, the bitmask may be scanned downward to then determine a location of a neck, a location of shoulders, and the like. The depth map or depth image data can be updated to include a probability that a pixel is associated with a particular virtual body part in the model.

According to an example embodiment, upon determining the values of a body part, a data structure may be created that may include measurement values such as length, width, or the like of the body part associated with the bitmask of the human target. In one embodiment, the data structure for the body part may include results averaged from a plurality of depth images captured in frames by the capture system 60 at a frame rate. The model may be iteratively adjusted at a certain number of frames. According another embodiment, the measurement values of the determined body parts may be adjusted such as scaled up, scaled down, or the like such that measurements values in the data structure more closely correspond to a typical model of a human body. A body model may contain any number of body parts, each of which may be any machine-understandable representation of the corresponding part of the modeled target.

In a model example including two or more body parts, each body part of the model may comprise one or more structural members (i.e., "bones"), with joints located at the intersection of adjacent bones. For example, measurement values determined by the bitmask may be used to define one or more joints in a skeletal model (illustrated below with respect to FIG. 10A, for example). The one or more joints may be used to define one or more bones that may correspond to a body part of a human. Each joint may allow one or more body parts to move relative to one or more other body parts. For example, a model representing a human target may include a plurality of rigid and/or deformable body parts, wherein some body parts may represent a corresponding anatomical body part of the human target. Each body part may be characterized as a mathematical vector defining joints and bones of the skeletal model. It is to be understood that some bones may correspond to anatomical bones in a human target and/or some bones may not have corresponding anatomical bones in the human target.

The bones and joints may collectively make up a skeletal model (FIG. 10A, 10D, 10E), which may be a constituent element of another model. The skeletal model may include one or more skeletal members for each body part and a joint between adjacent skeletal members.

As the user moves in physical space, as captured by capture device 20, the resultant image data may be used to adjust the skeletal model such that the skeletal model may accurately represent the user. According to an example embodiment, the model can be rasterized into a synthesized depth image. Rasterization allows the model described by mathematical vectors, polygonal meshes, or other objects to be converted into a synthesized depth image described in terms of pixels. Differences between an observed image of the target, as retrieved by a capture system, and a rasterized (i.e., synthesized) image of the model may be used to determine the force vectors that are applied to the model in order to adjust the body into a different pose. In one embodiment, one or more force vectors may be applied to one or more force-receiving aspects of a model to adjust the model into a pose that more closely corresponds to the pose of the target in the physical space of the capture area. The model may be iteratively adjusted as frames are captured. Depending on the type of model that is being used, the force vector may be applied to a joint, a centroid of a body part, a vertex of a triangle, or any other suitable force-receiving aspect of the model. Furthermore, in some embodiments, two or more different calculations may be used when determining the direction and/or magnitude of the force.

In one or more embodiments for capturing a user's natural movements, the capture device 20 repeatedly sends data for motion tracking to the computing system 12. The motion tracking data may include data referenced with respect to some form of a skeletal model such as vectors with respect to different joints, centroids or nodes to illustrate movement changes. The data may be referenced to a synthesized pixel data representation created from rasterizing the vector data. The data may also include a bitmask of the user for comparison on each update to detect which body parts are moving. Each body part is indexed so it can be identified, other parts of the capture area such as the furniture in the living room are identified as background, and the users are indexed so the machine representable data for their respective body parts can be linked to them.

The motion tracker 195 can use indices to identify which body parts have changed position between updates. For different body parts, there are associated gesture filters in a gesture library 455. A gesture filter includes instructions for determining whether the movements indicated in the update or a series of updates represents a gesture, which can be a movement itself or a resulting pose. The gestures can have a meaning with respect to a gesture based sign language, as described below.

In one embodiment, a gesture filter 450 (FIG. 10B) executes instructions comparing motion tracking data for one or more body parts involved with the gesture with parameters including criteria relating to motion characteristics which define the gesture. Some examples of motion characteristics include position, angle, speed and acceleration changes in a users hand and face, hand and finger shape as well as configuration, orientation, position and movement. For instance, a throw, may be implemented as a gesture comprising information representing the movement of one of the hands of the user from behind the rear of the body to past the front of the body, as that movement would be captured by a depth camera. Some examples of a parameter for the "throw" may be a threshold velocity that the hand has to reach, a distance the hand must travel (either absolute, or relative to the size of the user as a whole), and a direction of movement of the hand from behind the body to past its front. The parameters can be stored as metadata for its corresponding gesture. A parameter may comprise any of a wide variety of motion characteristics for a gesture. Where the filter comprises a parameter, the parameter value can take different forms, for example, it may be a threshold, an absolute value, a fault tolerance or a range.

Some more examples of motion characteristics that may be represented by parameters are as follows: body parts involved in the gesture, angles of motion with respect to a body part, a joint, other body parts or a center of gravity of the user's body as represented by his skeletal model, changes in position of a body part or whole body, and distances moved by a body part or whole body. Additionally, other examples of characteristics are a location of a volume of space around the user's body in which a body part moves, a direction of movement, a velocity of movement of a body part, a place where a movement occurs, an angle between a body part and another object in the scene, an acceleration threshold, the time period of the gesture, the specific time of the gesture, and a release point.

In an embodiment, the user also uses his voice to make, augment, distinguish or clarify a gesture.

Figure 10B:
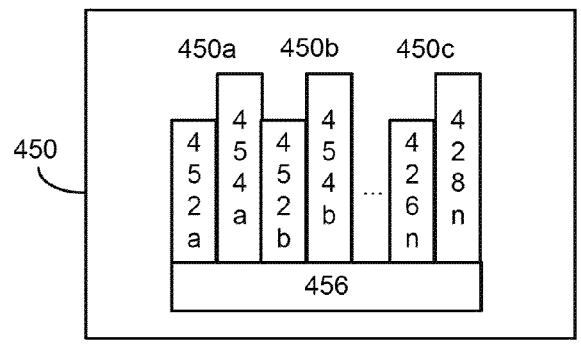
Figure 10C:
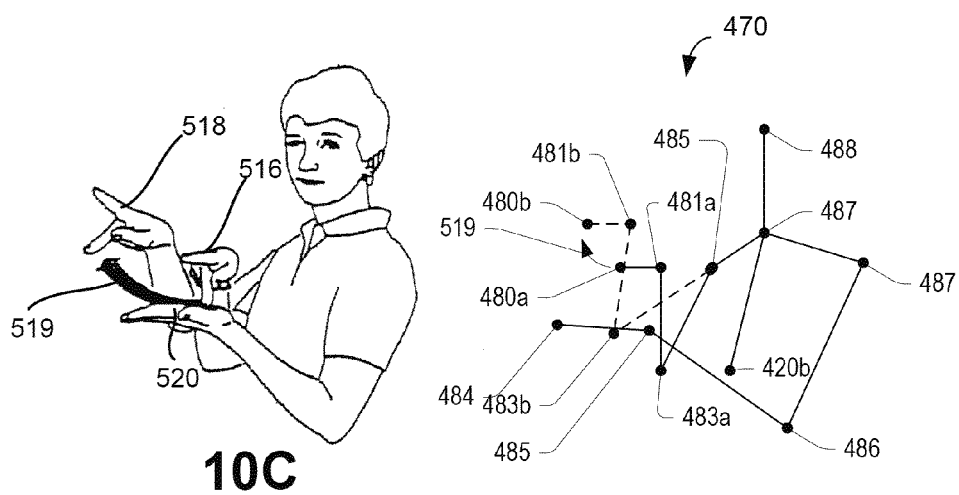
Figure 10E:
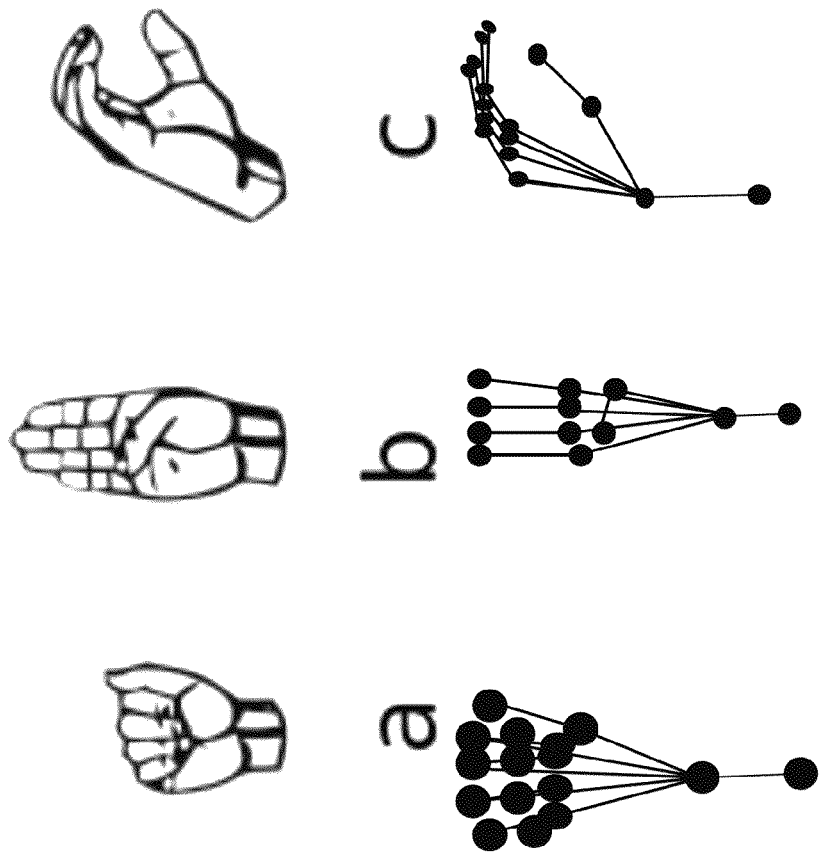
Figure 10D:
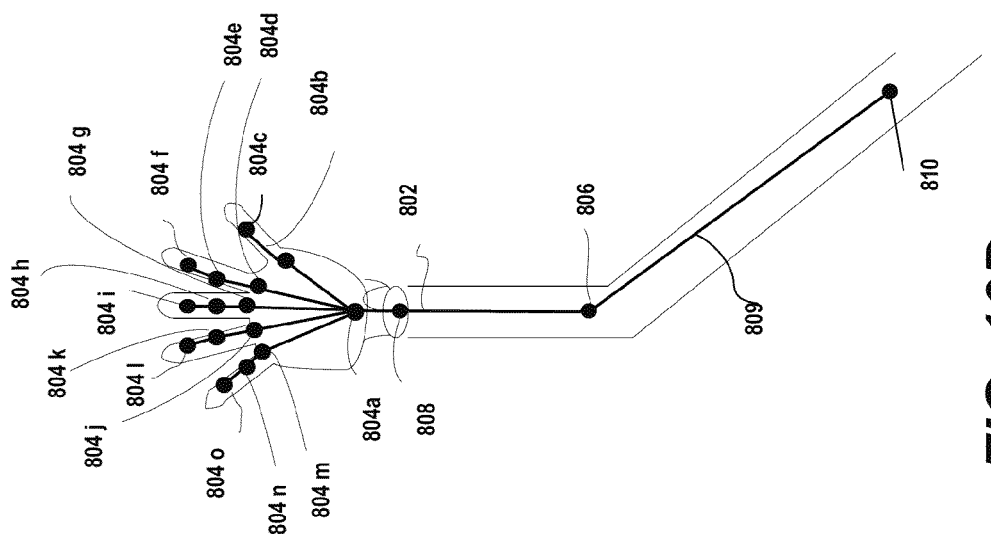

In one example, a gesture filter's criteria references a skeletal model like one or more of those shown in FIGS. 10A, 10D, 10E. The filter may comprise code and associated data that can process depth values, or vectors with respect to the skeletal data, or color image data or a combination of two or more of these when determining whether the parameter criteria are satisfied. For example, inputs to a filter may comprise things such as joint data about a user's joint position, angles formed by the bones that meet at the joint, RGB color data of a user which can be helpful for collision testing, and the rate of change of an aspect of the user. The input data may be presented as changes occur in position, speed, direction of movement, joint angle etc. with a previous positioning data set for the one or more body parts involved in the gesture.

Whether there is a match or not can be represented by one or more outputted confidence levels. In one example, the confidence level could be implemented on a linear scale that ranges over floating point numbers between 0 and 1, inclusive. In an embodiment, determining the confidence level may comprise a boolean determination based on the parameters associated with the filter. For example, each parameter may have its own associated confidence level that the motion characteristic associated with it is being made and which the motion tracker 196 may retrieve for its gesture determination. A weighting may be given each parameter and its confidence level which may be used by a weighting technique to determine a confidence level that the gesture as a whole is being made. Additionally, there may be an output of a motion characteristic for a given gesture. Examples of a motion characteristic include a time, speed, acceleration rate or angle at which a gesture is made.

More information about recognizer engine 190 can be found in U.S. patent application Ser. No. 12/422,661, "Gesture Recognizer System Architecture," filed on Apr. 13, 2009. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009.

As used herein, a computing environment 12 may refer to a single computing device or to a computing system. The computing environment may include non-computing components. The computing environment may include or be connected to a display device which displays an output. A display device may be an entity separate but coupled to the computing environment or the display device may be the computing device that processes and displays such as a notebook. Thus, a computing system, computing device, computing environment, computer, processor, or other computing component may be used interchangeably.

FIG. 3 illustrates an example embodiment of a computing system that may be the computing system 12 shown in FIGS. 1A-2 used to track motion and/or animate (or otherwise update) an avatar or other on-screen object displayed by an application. The computing system such as the computing system 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, Blu-Ray drive, hard disk drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio user or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation is large enough to contain the launch kernel, concurrent system applications and drivers. The CPU reservation is constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay scales with screen resolution. Where a full user interface is used by the concurrent system application, it is preferable to use a resolution independent of application resolution.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager controls the switching of input stream, without knowledge the gaming application's knowledge and a driver maintains state information regarding focus switches. The cameras 36, 38 and capture device 20 may define additional input devices for the console 100 via USB controller 126 or other interface.

FIG. 4 illustrates another example embodiment of a computing system 220 that may be used to implement the computing system 12 shown in FIGS. 1-2 to track motion and/or animate (or otherwise update) an avatar or other on-screen object displayed by an application. The computing system environment 220 is only one example of a suitable computing system and is not intended to suggest any limitation as to the scope of use or functionality of the presently disclosed subject matter. Neither should the computing system 220 be interpreted as having any dependency or requirement relating to any one or combination of components illustrated in the exemplary operating system 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 36, 38 and capture device 20 may define additional input devices for the console 100 that connect via user input interface 236. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233. Capture Device 20 may connect to computing system 220 via output peripheral interface 233, network interface 237, or other interface.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates application programs 248 as residing on memory device 247. It will be appreciated that the network connections shown are exemplary and other means of establishing a communications link between the computers may be used.

Either of the systems of FIG. 3 or 4, or a different computing system, can be used to implement Computing System 12 of FIG. 2. As explained above, computing system 12 determines the motions of the users and employs those detected motions to control a video game or other application. For example, a user's motions can be used to control an avatar and/or object in a video game. In some embodiments, the system can simultaneously track multiple users and allow the motion of multiple users to control or effect the application.

The system will use the RGB images and depth images to track a user's movements. For example, the system will track a skeleton of a person using a depth images. There are many methods that can be used to track the skeleton of a person using depth images. One suitable example of tracking a skeleton using depth images is provided in U.S. patent application Ser. No. 12/603,437, "Pose Tracking Pipeline," filed on Oct. 21, 2009. (hereinafter referred to as the '437 application). The process of the '437 application includes acquiring a depth image, down sampling the data, removing and/or smoothing high variance noisy data, identifying and removing the background, and assigning each of the foreground pixels to different parts of the body. Based on those steps, the system will fit a model with the data and create a skeleton. The skeleton will include a set of joints and connections between the joints.

In one embodiment, in order for a user's motion to be used to control an application the user must first be enrolled or bound to the application. In one embodiment, each user will be asked to identify himself or herself by standing in front of the system so that depth images and/or visual images can be obtained from multiple angles for that user. For example, the user may be asked to stand in front of the camera, turn around, and make various poses while depth images and visual images are obtained. After the system obtains enough depth and/or visual images, the system will create a set of identifying data from the images that uniquely identifies the user. The system will create a unique identification and associate that unique identification with on-screen representation (e.g., avatar) or other object in the game/application. After a user is enrolled in (or bound to) the application, the system will track the motion of that user while the user is actively engaged with the application (e.g., playing the game or using the application). However, in the past, other people in the room who are not actively engaged with the application, (e.g., not bound to application, bound to application but not playing current game, or bound to application but currently not having a turn to play) do not have a way to interact with the application.

FIGS. 5A through 5D depict different types of sign language using American Sign Language which need to be detected by the system. As described herein, sign language can comprise static signs or signs involving motion. A sign language is a language which uses visually transmitted gesture or sign to convey meaning. This may include, one or more of, simultaneous combinations of hand shapes, orientation and movement of the hands, arms or body, and facial expressions to express a speaker's thoughts. Sign language may include spatial grammars which are different from the grammars of spoken languages. Hundreds of sign languages are in use around the world. American Sign Language (or ASL) is the dominant sign language of the United States. In ASL, fingerspelling is used primarily for proper nouns, for emphasis (for example, fingerspelling STOP is more emphatic than signing 'stop'), for clarity, and for instruction.

ASL includes both fingerspelling borrowings from English, as well as the incorporation of alphabetic letters from English words into ASL signs to distinguish related meanings of what would otherwise be covered by a single sign in ASL. For example, two hands trace a circle to mean 'a group of people'. Several kinds of groups can be specified by handshape: When made with C hands, the sign means 'class'; when made with the F handshape, it means 'family'. Such signs are often referred to as "initialized" signs because they substitute the first letter (the initial) of the corresponding English word as the handshape in order to provide a more specific meaning.

When using alphabetic letters in these ways, several otherwise non-phonemic handshapes become distinctive. For example, outside fingerspelling there is but a single fist handshape—the placement of the thumb is irrelevant. However, within fingerspelling, the position of the thumb on the fist distinguishes the letters A, S, and T. Letter-incorporated signs which rely on such minor distinctions as thumb position tend not to be stable in the long run, but they may eventually create new distinctions in the language. Signs that may really too heavily on individual's relative digit sizes and flexibility are not ideal. This is analogous to spoken language using sounds that are easily replicated by a majority of speakers.

In FIG. 5A, examples of the sign alphabet according to American Sign Language are shown. The letters "A" 502, "B" 504 and "C" 506 are all made by static signs, the term static being used here to indicate that no motion is involved in actually presenting the sign meaning. Contrast with the letter J shown in FIG. 5B at 508. To make a letter J, the hand takes the form shown at 508 and also takes the motion along with line 509 to indicate the letter. Other signs are more complex, involving both hands and finger motion. FIG. 5C illustrates the sign for "pay" where user's right hand moves from position 516 to position 518 along arrow 519. The right hand moves relative to the non-moving left hand 520 shown in FIG. 5C. FIG. 5D illustrates an even more complex sign meaning "card." As illustrated in FIG. 5D, a person's right and left hand 511, 513 move along opposite directions 510 and 512 in a motion apart from each other after which the user's fingers are pinched as indicated at 514.

In order to provide a sign language translation system in accordance with the present technology, all such types of movements are defined as gestures. The gesture recognizer 190 interprets such gestures, along with facial and finger movements and positions, and compares detected gestures with those in library 193 to provide meaning to each gesture.

Similar signs may appear with different meaning relative to a user's expression or head tilt. For example, FIG. 6A illustrates an individual signing the phrase "father is home." Each of FIGS. 6A and 6B illustrates two signs "father" and "home." The left side of the FIG. 6A indicates a user making the term "father" with the right hand 602 placed against the user's forehead 610. The motion for "home" as indicated by the user moving her right hand across her cheek from position 604 to 606. In both the left and right side of FIG. 6A, the user's face is generally expressionless and facing the viewer. FIG. 6B illustrates the same signs, but posed in an interrogatory manner. The phrase in FIG. 6B is not a declaration "father is home," but rather a question "Is father home" or more literally "father is home?" The indication of a phrase made in the interrogatory comes from the expression of the user and the user's head tilt. As indicated in FIG. 6B, the signs 602, 604, 606 are the same, but the user's expression at 614 and 616 with head tilted slightly to the left and eyebrows raised indicates the expression is a question rather than a statement.

Figure 7:
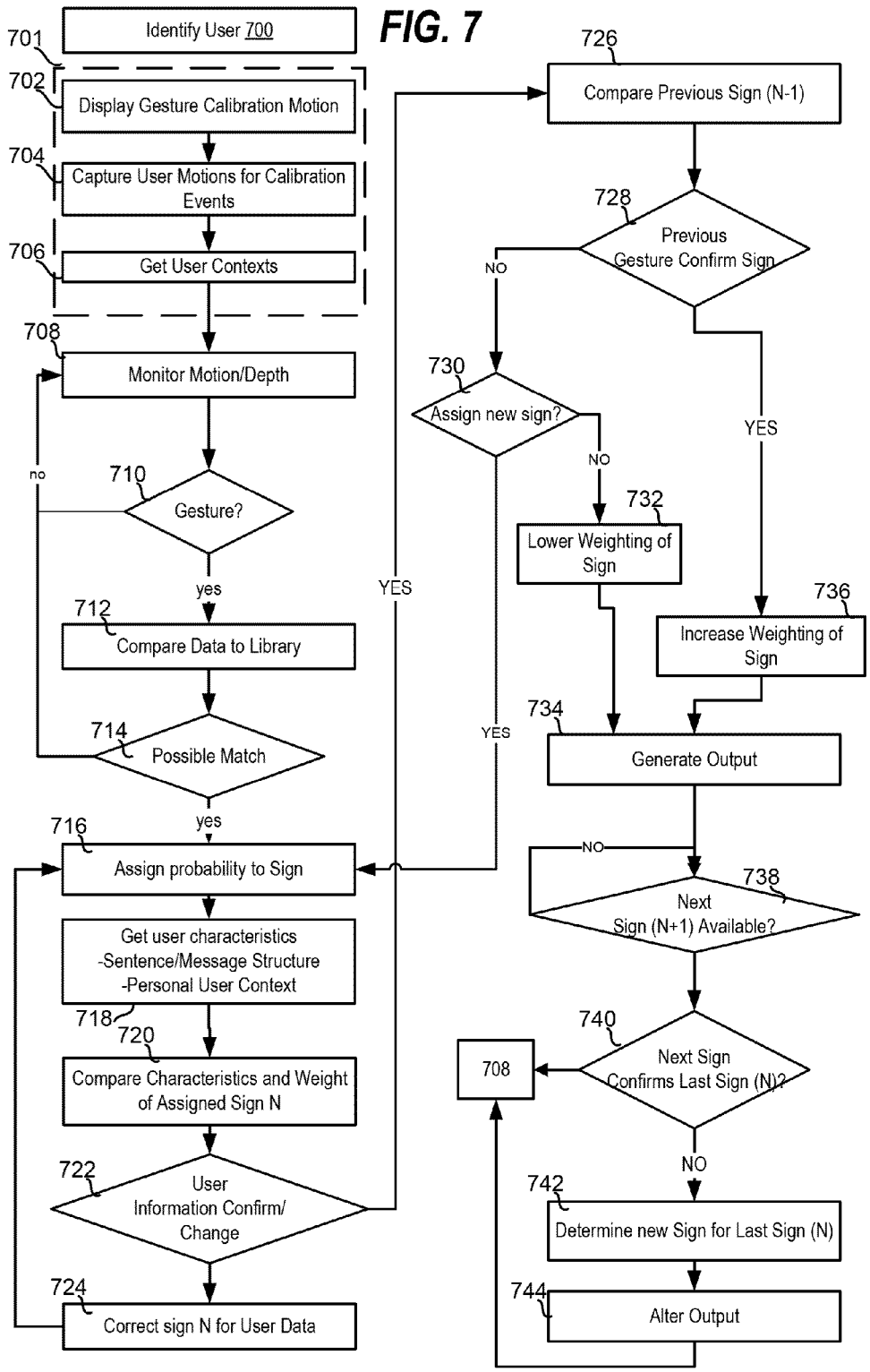
FIG. 7 is a flowchart illustrating a method in accordance with the present technology.

FIG. 7 illustrates a method in accordance with the present technology for providing a sign language interpretation system based on motion tracking and gesture interpretation. In one embodiment, a user is identified at 700. While not required, system 10 can store individual profiles of user motion for specific users. As discussed below, the system generates particular skeletal tracking models for a user and the model and profile information on specific tendencies and motion patterns of the user can be stored with a user profile. Applying known tendencies to motion and gesture detection for a user may increase the accuracy of gesture detection and sign language translation.

In one embodiment, a series of calibration steps 701 are performed. In alternate embodiments, calibration at 701 is not required. At step 702, a gesture calibration motion is displayed to the user. The gesture calibration motion can require a user to perform a particular gesture so that the system understands that particular motions used to perform a gesture in a particular way by a given user. It should be recognized that calibrations for each individual user can be stored by the system and different users recognize in accordance with the skeletal matching pattern detected by the processing device 12. Once the calibration motion is displayed, the user performs the calibration motion and at step 704, the user's motions are captured for the calibration event. Steps 702 and 704 can be repeated any number of times to provide a desired accuracy for the system. At step 706, user characteristic information may be acquired. User characteristic information may comprise user demographic such as the user's age, sex, interests, hobbies, favorites, or other information, which can be useful to the system in determining the probability that a user is making a particular sign. In one embodiment, characteristic information may be collected during the calibration steps by, for example, allowing the user to complete a questionnaire on the display. Calibration information may be stored at each of steps 702, 704 and 706 to the user profile. Calibration steps 702 and 704 may be repeated for any number of gestures and signs. Once calibration steps 701 are performed for a given user, they need not be repeated.

At 708, the scene in a field of view of the capture device 20 is monitored for user action. As the user makes gestures in the scene, the user's skeletal model is tracked, and hands and face motions detected, to determine whether a gesture has occurred at 710. User motion is tracked and gestures determined in accordance with the discussion below in FIGS. 10 and 11.

At 712, gestures that are recognized are compared to known sign data and if a possible match is found at 714, an initial sign is assigned to the gesture and an initial probability weight that the gesture is a particular sign at 716. Gesture motions may have a probability of being intended by the user as a given sign as well as a number of alternative possible signs that the gesture may be intended to make. When an initial sign is assigned to a detected gesture (N), any number of possible alternative signs which may also be potential meanings of the gesture may be stored in the library. Each sign may have a probability weight or score relative to a detected gesture. For example, a first alternative for a gesture may be the letter "A" with a second alternative gesture being the letter "B." Where the user is spelling a proper name, and the user's name is known, the method can adjust for an error in an initial interpretation by detecting that "A" is more or less likely to be used than "B" given other signs used by the user, and/or known data about the user. Because interpretation of the sign depends on context—user actions and signs made before and after a particular sign—the method further evaluates the initial determination at 714 to confirm or revise the initial determination based on user profile information and the sign's context relative to other signs in a motion stream. At step 718, if context information is available for a particular user, the context information is received at 720.

If the characteristic information is available then at 722, comparison is made between the user's personal characteristics and the initial sign which is assigned to the recognized gesture. If the characteristic information indicates that the sign is not correct, the sign may be corrected at 724. Comparison of the characteristic information to the initial sign is discussed below at FIG. 8. If the characteristic information confirms the initial assignment of the sign evaluation at 722, additionally, and optionally, the sign may be compared with other gestures at 728.

A previous gesture is received at 726 and a comparison made at 728 to determine whether the previous gesture (N−1) confirms the probability that the gesture is the initial sign recognized by the system at 716. If so, then the probability weight assigned to the initial sign will be increased at 736 and an output may be generated at 734 using the initial sign. Any number of different types of outputs may be generated by the system, including those illustrated below with respect to FIGS. 12 and 13. It should be further recognized that while in the illustrated method an output is generated at 734 and the sign (N) stored. An output may be generated at any point after a sign is recognized and assigned to a detected gesture.

It should be recognized that as a user may continually be providing signs within a scene in a stream of motion. Motions and gestures may be separated from other motions in a stream by recognizing transitions between signs based on the gesture filter assigned to a gesture and the context of the signs made in the motion stream.

At 728, if the previous gesture and sign recognized by the system do not confirm the initial sign assigned to the gesture, then at 730 a determination is made as to whether the previous sign in combination with one of several alternative possible signs attributable to the gesture justify assigning a new, revised sign to the gesture (N). If a new sign is assigned, the method returns to 716 and assigns a new probability to the new sign (N) based on revised information from the previous gesture. If not, then at 732 the probability weighting assigned to the new sign is lowered and the output generated at 724.

As the system is continually receiving gestures and sign, a next sign (N+1) based on another gesture made by the user following the initial gesture will be interpreted and a next gesture will be retrieved at 738. The next gesture will have a probability assigned to it and can be used to determine whether or not a previously assigned gesture (in this case sign (N)) is or is not likely to be the sign which has been assigned the gesture at 716. At 740 a comparison of the initially assigned sign for sign N is compared with the next sign (N=!) to determine whether the context of the next sign confirms the initial sign. A determination of a new sign for the initial sign may be made at 742 and if a new sign is determined for the initial sign, the output can be altered at step 742.

Figure 8:
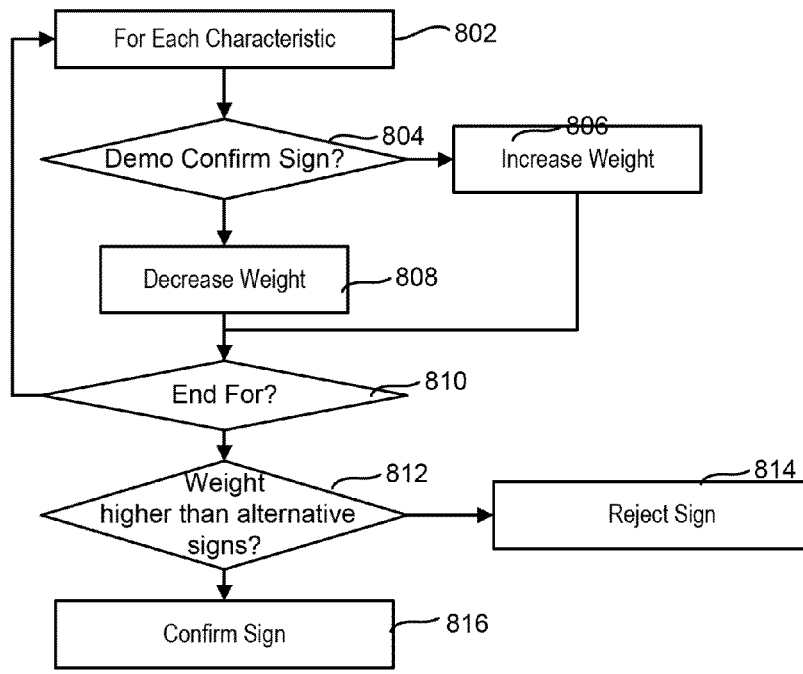
FIG. 8 is a flowchart illustrating a method of comparing gestures to a library of known signs.

FIG. 8 illustrates a process which may be performed at step 726 to evaluate whether the context information confirms the sign assigned to the gesture. At 802, for each characteristic in a user's personal demographic information, a determination is made at steps 804, whether the demographic increases or decreases the probability that the sign assigned to the gesture is correct. If the sign is likely in view of the demographic, the weight assigned to the sign is increased at 806. If not, the weight is decreased at 808. This continues for each demographic information for the individual. It should be noted that not all demographic information may be relevant to all signs. Demographic information may include the user's gender, native language, location, history, favorites, and the like. At 812, once all relevant demographic information has been checked against the assigned sign, a determination is made as to whether alternative signs in the library are a better match based on the probability that such alternative signs have a higher probability weighting relative to the adjusted weight of the modified score of the assigned sign (N).

Figure 9:
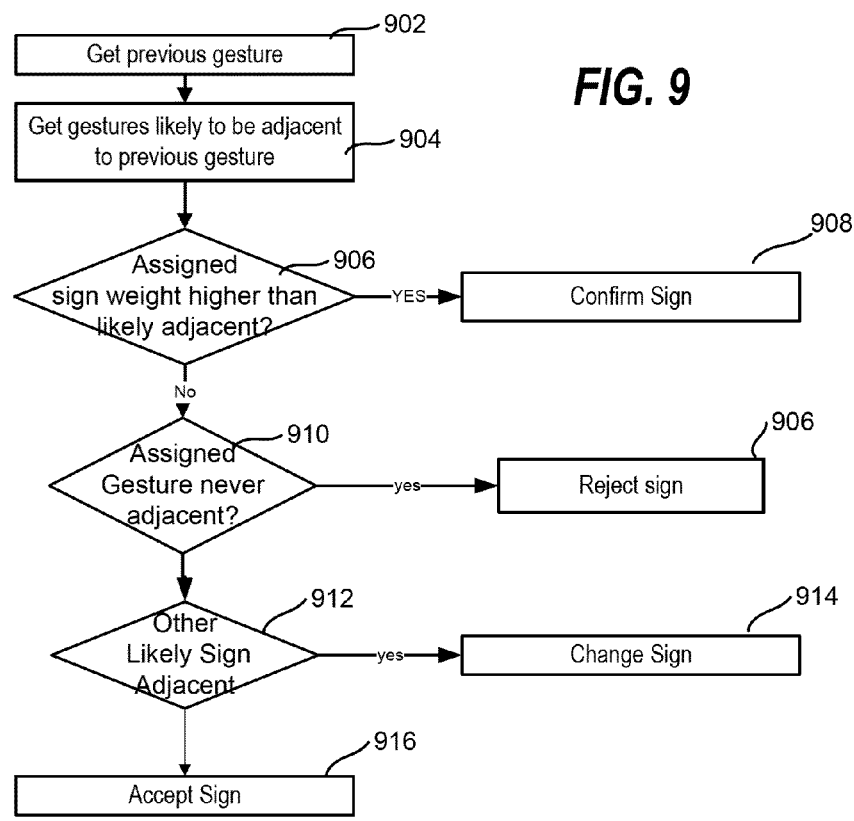
FIG. 9 is a flowchart illustrating a method of comparing signs to adjacent signs.

FIG. 9 illustrates a process which may occur at steps 728 or 740 to determine whether a previous sign or next sign assigned to a previous/next gesture confirms an assigned sign. At 902, the previous/next gesture and the sign assigned to the previous or next gesture are retrieved. At step 904, the system consults the dictionary to determine whether or not additional signs would be likely to be adjacent to the previous gesture. The library may contain a contextual database which includes sign contact information that identifies a likelihood that a particular word, and in this case sign, would appear adjacent to other words or signs. The position of signs relative to each other may be compared to ascertain that the signs assigned to each of adjacent gestures make sense in a linguistic context.

This can be used to define sentence structures with a high probability of accuracy. In 906, a determination is made as to whether or not the matched sign is likely to be positioned adjacent to the previous or next sign. If so, the assigned sign can be confirmed at 908. If not, a determination is made at 910 as to whether or not the sign assigned to the gesture would never be adjacent to the previous sign. If so, the sign is rejected at 912. If the assigned sign can be adjacent to previous or next sign at 910, then at 912 a determination is made as to whether another sign is more likely to be adjacent to the previous or next sign than the assigned sign. If so, an indication is made to change the sign at 914 (which may occur at 730 or 742 in FIG. 7). If not, the sign is confirmed at 916.

FIG. 10A depicts an example skeletal mapping of a user that may be generated from the capture device 20 in the manner described above. In this example, a variety of joints and bones are identified: each hand 402, each forearm 404, each elbow 406, each bicep 408, each shoulder 410, each hip 412, each thigh 414, each knee 416, each foreleg 418, each foot 420, the head 422, the torso 424, the top 426 and bottom 428 of the spine, and the waist 430. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 404 in front of his torso 424. A gesture may also incorporate props, such as by swinging a mock sword. A gesture may comprise more than one body part, such as clapping the hands 402 together, or a subtler motion, such as pursing one's lips.

Gestures may be used for input in a general computing context. For instance, various motions of the hands 402 or other body parts may correspond to common system wide tasks such as navigate up or down in a hierarchical menu structure, scroll items in a menu list, open a file, close a file, and save a file. Gestures may also be used in a video-game-specific context, depending on the game. For instance, with a driving game, various motions of the hands 402 and feet 420 may correspond to steering a vehicle in a direction, shifting gears, accelerating, and breaking.

Gesture parameters may include threshold angles (e.g., hip-thigh angle, forearm-bicep angle, etc.), a number of periods where motion occurs or does not occur, a threshold period, threshold position (starting, ending), direction movement, velocity, acceleration, coordination of movement, etc.

A gesture may be associated with a set of default parameters that an application or operating system may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Where an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 402-410 to full length while making the grab gesture. In this situation, a similar grab gesture where the user only partially extends his arm 402-410 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 410a, and on the same side of the head 422 as the throwing arm 402a-410a. It may not be necessary to define all bounds of a volume, such as with this throwing gesture, where an outer bound away from the body is left undefined, and the volume extends out indefinitely, or to the edge of capture area that is being monitored.

FIG. 10B provides further details of one exemplary embodiment of the gesture recognizer engine 190 of FIG. 2. As shown, the gesture recognizer engine 190 may comprise at least one filter 450 in library 450a to determine a gesture or gestures. A filter 450 comprises parameters defining a gesture 452 (hereinafter referred to as a "gesture") along with metadata 454 for that gesture. A filter may comprise code and associated data that can recognize gestures or otherwise process depth, RGB, or skeletal data. For instance, a throw, which comprises motion of one of the hands from behind the rear of the body to past the front of the body, may be implemented as a gesture 452 comprising information representing the movement of one of the hands of the user from behind the rear of the body to past the front of the body, as that movement would be captured by the depth camera. Parameters 454 may then be set for that gesture 452. Where the gesture 452 is a throw, a parameter 454 may be a threshold velocity that the hand has to reach, a distance the hand must travel (either absolute, or relative to the size of the user as a whole), and a confidence rating by the recognizer engine that the gesture occurred. These parameters 454 for the gesture 452 may vary between applications, between contexts of a single application, or within one context of one application over time.

A filter may comprise code and associated data that can recognize gestures or otherwise process depth, RGB, or skeletal data. Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the capture area, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine that provides functionality to a gesture filter 450. In an embodiment, the functionality that the base recognizer engine 456 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 450 are loaded and implemented on top of the base recognizer engine 456 and can utilize services provided by the engine 456 to all filters 450. In an embodiment, the base recognizer engine 456 processes received data to determine whether it meets the requirements of any filter 450. Since these provided services, such as parsing the input, are provided once by the base recognizer engine 456 rather than by each filter 450, such a service need only be processed once in a period of time as opposed to once per filter 450 for that period, so the processing required to determine gestures is reduced.

An application may use the filters 450 provided by the recognizer engine 190, or it may provide its own filter 450, which plugs in to the base recognizer engine 456. In an embodiment, all filters 450 have a common interface to enable this plug-in characteristic. Further, all filters 450 may utilize parameters 454, so a single gesture tool as described below may be used to debug and tune the entire filter system. These parameters 454 may be tuned for an application or a context of an application by a gesture tool.

FIG. 10C illustrates a more fine-grained tracking model used in conjunction with classification of signs made by a hand and arms. A user performing the gesture for "PAY" is illustrated at in the left hand side of the figure A corresponding tracking model 470 is illustrated adjacent to the user depicted. The model in FIG. 10C has a high resolution model than that illustrated in FIG. 10A. The model in FIG. 10c includes elements for a user hand 480, wrist 481, and elbow 483 of the user's right limb and corresponding elements 484-486 for a left limb. As illustrated therein, when a user moves hand 518 along the motion of line 519, the corresponding motion is tracked for at least points 481 (from 481a to 481b), 482 (from 482a to 482b), and 483 (from 483a to 483b).

FIGS. 10D and 10E illustrate a tracking model used with the signs of the hand. In FIG. 10D, a models may include at least points 804a-804m for a hand of a user, as well as a wrist point 808, elbow 806, forearm 802, upper arm 809 and shoulder 810. FIG. 10E illustrates the hand model 800 of FIG. 10D showing gestures for the letters "a", "b", and "c" using ASL conventions. (Reference numerals omitted in FIG. 10E for clarity.)

Figure 11:
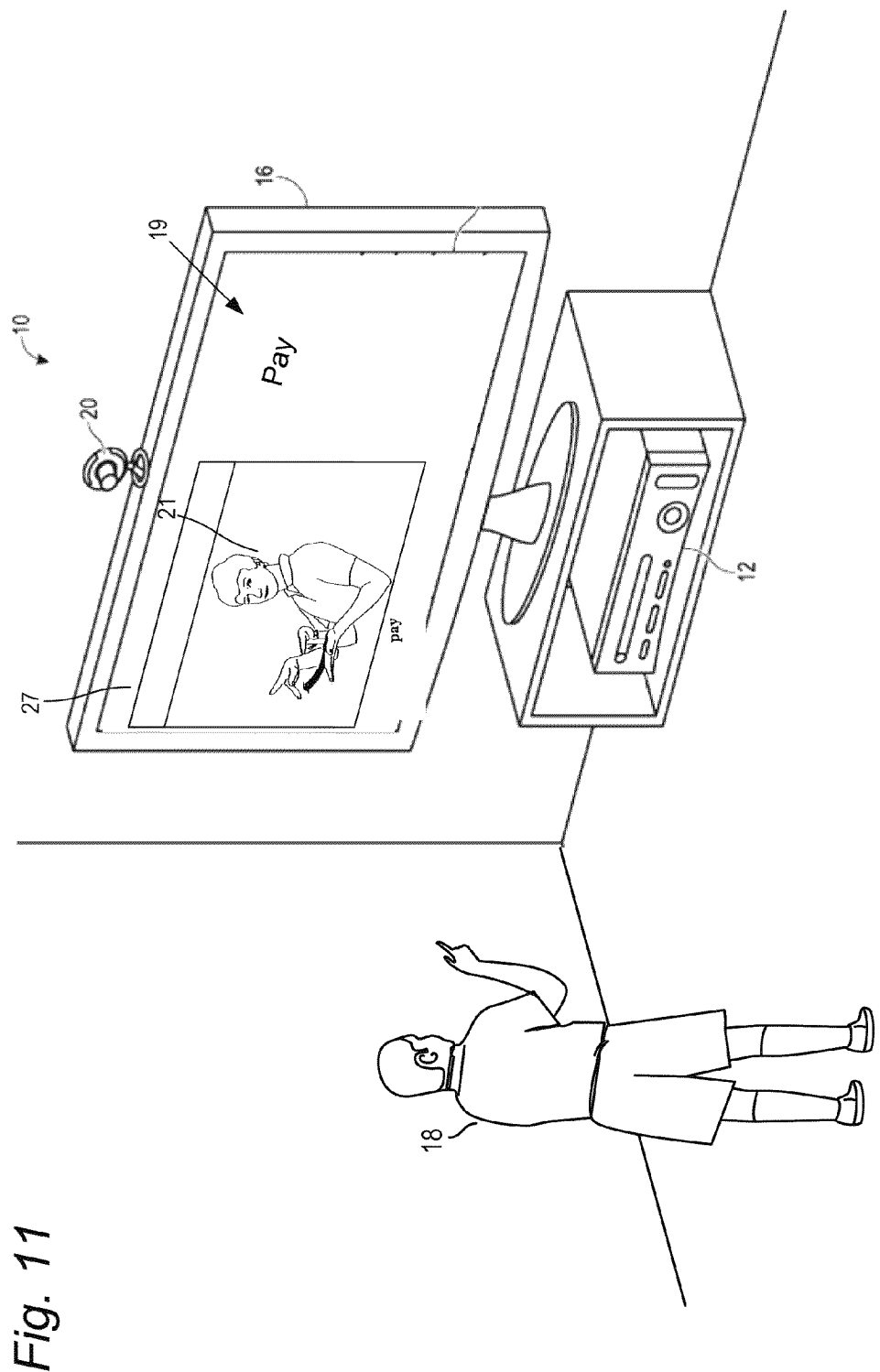

FIGS. 11 and 12 illustrate two examples of outputs generated on a display 16 by the output generator 188. In FIG. 14, a user is making a pay gesture and the word "PAY" may appear at 19 on a display 16. In this case the word "PAY" is positioned next to a representation of a user at 21 which is provided in a window 27. A representation 21 can be an actual representation of the user, or a generated Avatar in accordance with the teachings of the U.S. patent application Ser. No. 12/511,850, entitled "Auto Generating a Visual Representation". As illustrated in FIG. 12, the entire context of a series of gestures can be illustrated at 19. In FIG. 12, the user is completing the sign for late and has previously completed a number of gestures which define the words "we are leaving." Any number of different types of user interfaces may be provided in accordance with the technology.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A computer implemented method for interpreting sign language, comprising:
   capturing a scene using a capture device, the scene including a human target;
   tracking movements of the human target in the scene;
   detecting one or more gestures of the human target in the scene;
   comparing the one or more gestures to a library of sign language signs; and
   determining a match between the one or more gestures and one or more sign by adjusting a probability weight of each sign based on acquired individual profiles of user motion for users, and comparing each probability weight against other signs likely to be assigned to a detected gesture.

2. The computer implemented method of claim 1 further including providing an output translating the one or more signs.

3. The computer implemented method of claim 1 wherein the step of detecting includes detecting at least a first and a second adjacent gestures, and the determining includes determining a match of the first and second adjacent gestures with a first sign and a second sign, respectively.

4. The computer implemented method of claim 3 further including comparing the first and second signs relative to each other to determine the accuracy of the match between the first sign and the first gesture.

5. The computer implemented method of claim 4 wherein the step of detecting further includes detecting a third sign after the second sign and further including comparing the first sign and the third sign to the second sign to determine the accuracy of the second sign to the second gesture.

6. The computer implemented method of claim 5 wherein each step of comparing includes determining whether each sign makes sense in a linguistic context.

7. The computer implemented method of claim 5 further including acquiring user demographic information and further including comparing each match with the user demographic information to verify the accuracy of the match.

8. The computer implemented method of claim 1 wherein the step of determining a match includes assigning a probability weight indicating the strength of the match between the gesture and the sign.

9. The computer implemented method of claim 1 further including acquiring individual profiles of user motion for users applying known tendencies to motion and gesture detection for a user to increase the accuracy of gesture detection and sign language translation, and determining a match includes applying known tendencies for the user to motion and gesture detection and grammatical information.

10. A computer storage device including instructions for programming a processing device to perform a series of steps, comprising:
   capturing a scene using a capture device, the scene including a human target;
   tracking movements of the human target in the scene;
   detecting a plurality of gestures of the human target in the scene;
   assigning a first sign to a detected gesture by assigning a probability weight indicating strength of the match between the detected gesture and the first sign;
   assigning a second sign to an adjacent detected gesture by assigning a probability weight indicating the strength of the match between the adjacent detected gesture and the second sign;
   acquiring individual profiles of user motion for human targets applying known tendencies to motion and gesture detection for each human target; and
   comparing the first sign and the second sign to verify accuracy of the second sign, including applying profile information of a detected human target to adjust a probability weight assigned for each sign.

11. The computer storage device of claim 10 further including outputting a user perceptible translation of the first and second sign.

12. The computer storage device of claim 10 wherein the step of detecting further includes detecting a third sign after the second sign and further including comparing the first sign and the third sign to the second sign to determine the accuracy of the second sign to the adjacent detected gesture.

13. The computer storage device of claim 12 wherein the step of comparing the first sign and the third sign to the second sign includes determining whether each sign makes sense in a linguistic context.

14. The computer storage device of claim 13 further including instructions for performing a step of acquiring user demographic information and comparing each match with the user demographic information to verify the accuracy of the match.

15. The computer storage device of claim 14 wherein each step of assigning includes determining a match between a detected gesture and a sign, and further includes assigning a probability weight to each sign indicating the strength of the match between the gesture and the sign.

16. The computer storage device of claim 15 wherein the step of comparing the first and third sign includes comparing each match with the user demographic information to verify the accuracy of the match.

17. The computer storage device of claim 15 wherein the step of comparing includes adjusting the probability weight of the second sign based on the user information and a grammar database and comparing the probability weight against other signs likely to be assigned to a detected gesture.

18. An image capture system including:
   a capture device including an RGB sensor and a depth sensor;
   a host device, the host device providing a video output, the host device including a processor and instructions for programming the processor to perform a method comprising:
      tracking movements of a human target in a scene acquired by the capture device,
      detecting one or more gestures of the human target in the scene;
      comparing the one or more gestures to a library of sign language signs and assigning a first sign to a first detected gesture, assigning a second sign to a second detected gesture, and assigning a third sign after the second sign to a third detected gesture, each said assigning including assigning a probability weight indicating strength of a match between the gesture and each said sign,
      comparing the first sign and the third sign to the second sign to determine the accuracy of the second sign to the first and third signs, said comparing including assigning a probability weight to each of the first and third signs indicating a strength of the match between the gesture and the sign based on a comparison to the second sign; and
      acquiring individual profiles of user motion for users applying known tendencies to motion and gesture detection for a user to increase accuracy of gesture detection and sign language translation, each said comparing step using information from a human target profile in assigning a probability weight.

19. The image capture system of claim 18 coupled to a display device, further including instructions programming the processor to generate an output to a display device indicating a translation of the first and second sign on the display device.

20. The system of claim 18 wherein comparing the first sign and the third sign to the second sign includes comparing each sign against a grammatical database to determine a probability that the signs appear adjacent to each other and wherein the method performed by the processor further includes a step of acquiring user demographic information and wherein comparing the first and third sign includes comparing each match with user demographic information to verify the accuracy of the match.

* * * * *